Figure 1:
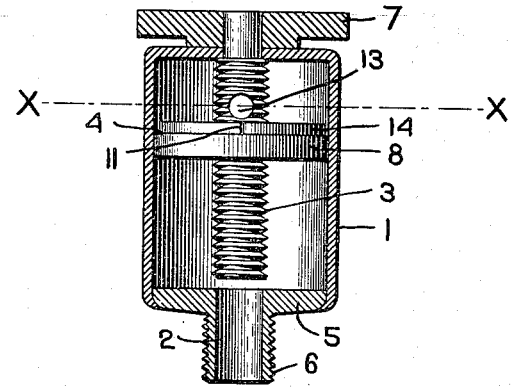

E. R. MacAUSLAND.
GREASE CUP.
APPLICATION FILED MAR. 16, 1915.

1,155,316.

Patented Sept. 28, 1915.

Witnesses.
J. Morrill Fuller
William E. Gagen

Inventor.
Earle R. MacAusland,
by Heard Smith & Tennant.
Atty's.

UNITED STATES PATENT OFFICE.

EARLE R. MacAUSLAND, OF BOSTON, MASSACHUSETTS.

GREASE-CUP.

1,155,316.  Specification of Letters Patent.  Patented Sept. 28, 1915.

Application filed March 16, 1915. Serial No. 14,748.

*To all whom it may concern:*

Be it known that I, EARLE R. MacAUSLAND, a citizen of the United States, residing at Boston, county of Suffolk, State of Massachusetts, have invented an Improvement in Grease-Cups, of which the following description, in connection with the accompanying drawing, is a specification, like characters on the drawing representing like parts.

This invention relates to grease cups and has for its principal object to provide a novel grease cup which can be filled directly from the grease gun without removing the grease cup from the machine on which it is used. I secure this end by providing my improved grease cup with a filling port through which the grease or other lubricant can be introduced under pressure and while the grease cup is in its position on the machine, the construction being such that after the cup is filled the advancing of the follower for a short distance will close the inlet or filling port thereby preventing any grease or lubricant from being discharged therethrough while the cup is in operation.

In order to give an understanding of my invention I have illustrated in the drawings a selected embodiment thereof which will now be described, after which the novel features will be pointed out in the appended claim.

Figure 2:
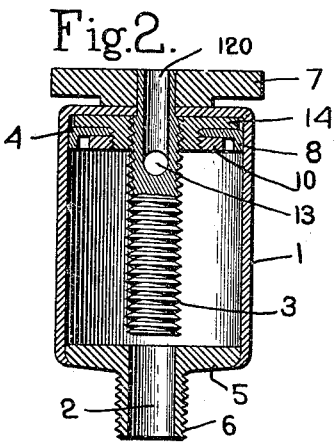
Figure 3:
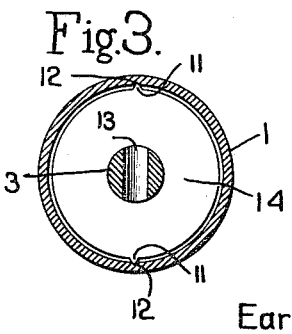

In the drawings, Figure 1 of the drawings is a vertical sectional view of a grease cup embodying my invention; Fig. 2 is a similar view showing the follower retracted into a position to open the inlet or filling port which is the position of the parts when the grease cup is being filled; Fig. 3 is a section on the line x—x, Fig. 1.

The grease cup comprises a lubricant-containing chamber 1 which is provided with an outlet port 2 leading to the part to be lubricated and a screw-threaded stem 3 swiveled to the chamber and carrying a follower or plunger 4 by which the lubricant in the chamber is forced through the outlet 2, all as usual in grease cups. I prefer to make the body of the grease cup 1 from sheet metal which is pressed into shape, although this is not essential to the invention. The discharge port 2 is shown as formed in a head 5 having a screw-threaded stem 6, which head is forced into the end of the cup-shaped body 1 and retained in place in any suitable way. The screw-threaded stem 3 extends up through an opening in the top of the chamber 1 and has a thumb-piece 7 fast thereto by which it may be turned.

The follower 4 may have any suitable construction and means are provided for preventing it from turning as the screw-threaded stem 3 is turned. In the illustrated embodiment of my invention the follower comprises a body portion 14 screw-threaded to the stem and carrying a packing member 8 of leather or similar material which is held to the body portion by a screw-threaded washer member 10, and the body is formed with projecting points 11 which operate in grooves 12 formed in the walls of the chamber 1. The member 14 will be made slightly resilient and of such a size that the points or projections 11 will be yieldingly held in the groove with sufficient force to prevent the follower from turning.

For filling the grease cup I have provided an inlet or filling port 12 which extends from the exposed end of the stem 3 into the lubricant-containing chamber, said port being herein shown as opening through the sides of the stem at points 13 situated a distance from the top of the cup which is at least equal to the thickness of the follower.

The parts are shown in Fig. 1 in their normal position and it will be obvious that by simply turning the head 7, the follower 4 will be advanced to force the lubricant through the discharge port 2. When the grease cup is to be filled the stem 3 is turned by manipulating the head 7 so as to retract the follower 4 into the position shown in Fig. 2, in which position it is situated above the inner ends 13 of the filling port. When the follower is in this position the filling port is open and the grease or other lubricant can be forced under pressure into the lubricant-containing chamber through the inlet port 12. If the lubricant is a non-fluid one, the filling operation can be performed directly from the usual grease gun by applying the nozzle thereof to the outer end of the filling port 12 and forcing the grease through said port. When the grease cup has been filled the thumb-piece 7 is turned to advance the follower into a position beyond the inner end 13 of the port, in which position the follower closes the filling port thereby preventing the grease or lubricant from being forced out through the filling port as the grease cup is used.

The construction I have herein illustrated is very simple and it provides a grease cup which can be filled very quickly and without the laborious and more or less unpleasant task of removing the grease cup and filling it by hand.

I claim:

In a grease cup, the combination with a lubricant-containing chamber having a discharge port, of a screw-threaded stem swiveled to said chamber, a follower screw-threaded to said stem, the latter having a filling port which leads from the exposed end thereof to the interior of the chamber and through which said chamber can be filled, which port is opened and closed by the follower as it is moved on the stem.

In testimony whereof, I have signed my name to this specification in the presence of two subscribing witnesses.

EARLE R. MacAUSLAND.

Witnesses:
Louis C. Smith,
Bertha F. Heuser.

Copies of this patent may be obtained for five cents each, by addressing the "Commissioner of Patents, Washington, D. C."